United States Patent [19]

Podlas

[11] 3,719,503
[45] March 6, 1973

[54] PROCESS OF PREPARING CMC GELS
[75] Inventor: Thomas J. Podlas, Newark, Del.
[73] Assignee: Hercules Incorporated, Wilmington, Del.
[22] Filed: Nov. 25, 1970
[21] Appl. No.: 92,933

[52] U.S. Cl. ..................99/129, 99/131, 99/134, 99/139, 99/144
[51] Int. Cl. ..............................A23l 1/04, A23l 1/06
[58] Field of Search .99/129, 131; 424/154; 106/181, 106/193, 194, 197 C; 252/316

[56] References Cited

UNITED STATES PATENTS 3,049,433  8/1962  Butler ................................106/197 C
2,733,156  1/1956  Cornell ..............................106/197 C Primary Examiner—Raymond N. Jones
Assistant Examiner—J. M. Hunter
Attorney—William S. Alexander

[57] ABSTRACT

CMC gels are prepared at controlled duration of gelation by mixing together (a) a water solution of certain chelated aluminum salts adjusted to a pH of 4.5 – 9.0, and (b) a water solution of CMC, the pH of the final mixture being about 4.5 – 7.0. Preferred aluminum salts are aluminum sulfate, sodium, potassium or ammonium alum. Citric acid and its sodium, potassium and other water soluble salts are preferred as chelants.

3 Claims, No Drawings

PROCESS OF PREPARING CMC GELS

The present invention relates to a process of preparing gels and the resulting gelled products. More particularly the present invention relates to a process of controlling the gelation time of aqueous systems which include carboxymethylcellulose (CMC) in solution as one of the ingredients, the gelation time being controlled to any period desired throughout a wide range of time.

It is known to gel CMC by crosslinking the CMC with trivalent cations, e.g., aluminum salts. However this has several drawbacks. According to such prior art method an aqueous slurry of a slowly soluble salt of aluminum (generally basic aluminum acetate) is added to a water solution of CMC. As the aluminum salt dissolves, aluminum ions are made available slowly to cross-link the CMC and cause gelation. One drawback to this prior art method is that the rate of solubility of the aluminum salt varies with age, particle size and method of manufacture. Too rapid solubility of the aluminum salt causes precipitation of the aluminum salt of CMC (AlCMC), and too slow solubility either makes gelation time so long as to be unacceptable or prevents gelation entirely. A further drawback is that such prior art slurries in which the aluminum salt is sufficiently soluble to be of practical use must be used immediately after preparation, otherwise the aluminum ion concentration will be too high and hence cause AlCMC precipitation. Moreover these prior art CMC gels are unsuitable for use in foods because basic aluminum acetate is not approved as an intentional food additive, foods being a very large and practical use for the gels of the present invention.

Although the present invention is applicable to gels in general wherein CMC is one of the ingredients, for the sake of simplicity and ease of understanding it will be described hereinafter largely with reference to use in foods as the preferred use.

The present invention provides for gelling aqueous CMC systems and controlling the gelation time to any period desired throughout a wide range of time. This gives ample time before gelation for incorporating other ingredients (e.g. foodstuffs), handling and packaging and it also enables gelling within a practical period of time. This gelation process comprises mixing the following ingredients.

(a) a first water solution comprising
  (1) aqueous aluminum sulfate, or an aqueous sodium, potassium or ammonium alum, the aluminum concentration being about 0.1 – 5 percent by weight of (a),
  (2) an aluminum chelant, the chelant/aluminum molar ratio being about 0.2 – 0.9, and
  (3) a base in an amount sufficient to adjust the pH of said first solution to 4.5 – 9.0, , and
(b) a second water solution comprising
  (1) aqueous carboxymethylcellulose having a concentration of about 0.25 – 7.0 percent by weight of (b), and
  (2) a base or acid in an amount sufficient to adjust the pH of said second water solution to about 4.0 – 7.5, the relative proportions of (a) and (b) employed being such as to provide in the final mixture thereof a molar ratio of aluminum atoms to anionic functional groups in the carboxymethylcellulose of about 0.05 – 1.2, a carboxymethylcellulose content of about 0.2 – 5.0 percent by weight of the total water present, and a pH of about 4.5 – 7.0. Optionally any additional ingredients (including those soluble and those insoluble in the mixture) may be incorporated into the mixture. These additional ingredients include e.g., foods or food components, and fillers.

The following examples illustrate specific embodiments of the present invention. These examples are not intended to limit the present invention beyond the spirit and scope of the appended claims. In these examples and elsewhere herein, percent and ratios are by weight unless otherwise shown. In these examples the following procedure was employed.

A. Chelated Aluminum Salt Solution

Aluminum salt was dissolved in water, after which the chelant was added with stirring. The resulting solution was raised to the pH desired by adding NaOH.

B. CMC Solution

CMC was dissolved in water with stirring. If necessary the solution was adjusted to the pH desired by adding a base or acid.

C. Final Mixture

Solutions A and B were mixed together in the relative proportions sufficient to give the desired molar ratio of aluminum atoms to anionic functional groups in the CMC, the desired CMC content, and the desired pH.

EXAMPLE 1

A. Chelated Aluminum Salt Solution 3.2 grams of $Al_2(SO_4)_3 \cdot 18H_2O$ were dissolved in 100 ml. water, after which 0.6052 gram citric acid monohydrate was added and dissolved with stirring. This gave a solution 0.096 molar in aluminum with a citrate/aluminum ratio of 0.3 and a pH of 2.0. With about 20% NaOH, the pH was raised to 7.0. The aluminum concentration was then 0.092 molar.

B. CMC Solution 10.0 grams of CMC–7HF were dissolved in 990 grams water; a Lightnin' air stirrer was used to facilitate dissolving the CMC. After 2 hours stirring, the solution was complete. Viscosity was 1,650 cps. The pH was 7.2.

C. Final Mixture

To 100 grams of solution B, sufficient HCl was added to lower the pH to 4.6 (about 1.5 ml. of 0.5M HCl). 20 grams of dried beef chips were blended with this solution; then 10 ml. of solution A was added with hand stirring. The beef stayed suspended after the stirring had stopped, and after 3 more minutes a soft gel was formed which became firm in 30 additional minutes.

Mixing and gelation were carried out at 25° C.

EXAMPLE 2

Final Mixture

To 100 grams of solution B (of Example 1), sufficient 0.5M HCl was added to bring the pH to 5.8. Ten ml of solution A (of Example 1) was then added to solution B with hand stirring. After 15 minutes the viscosity increased sufficiently to enable suspension of 20 grams of peas and carrots (dried) in the liquid. In 40 more minutes a very soft gel was formed, which firmed slightly after 3 additional hours.

Mixing and gelation were carried out at 25°C.

EXAMPLES 3–28

These Examples 3–28 were carried out using the procedure of Example 1, except as otherwise shown in Table 1 hereinafter giving further details.

TABLE 1

| Example number | Al+3 source | Chelated aluminum solution | | | | CMC¹ solution | | | | Final mixture | | | Gel | | |
|---|---|---|---|---|---|---|---|---|---|---|---|---|---|---|---|
| | | Chelant | Ratio chel./Al | Al+3 chel., percent | pH | CMC² type | Conc., percent | pH | CMC conc., percent | Ratio Al/anionic functionality of CMC | pH | Other ingred. | Temp. of prep., °C | Time | Strength |
| 3 | Al₂(SO₄)₃ | Citric acid | 0.3 | 0.26 | 6.5 | 7H | 1.0 | 7.0 | 0.91 | 0.28 | 6.7 | | 25 | 100 min | Soft. |
| 4 | Al₂(SO₄)₃ | do | 0.5 | 0.26 | 5.5 | 7H | 1.0 | 7.0 | 0.91 | 0.28 | 6.5 | | 25 | 35 min | Firm. |
| 5 | Al₂(SO₄)₃ | Malic acid | 0.8 | 0.26 | 6.5 | 7H | 1.0 | 4.8 | 0.91 | 0.28 | 5.2 | | 25 | 30 min | Do. |
| 6 | Al₂(SO₄)₃ | Citric acid | 0.5 | 0.26 | 9.0 | 7H | 1.0 | 4.0 | 0.91 | 0.28 | 4.9 | | 25 | 70 min | Do. |
| 7 | Al₂(SO₄)₃ | do | 0.5 | 0.26 | 4.5 | 7H | 1.0 | 7.0 | 0.91 | 0.28 | 5.6 | | 25 | 2 min | Rigid. |
| 8 | Al₂(SO₄)₃ | do | 0.5 | 0.26 | 6.5 | 7H | 0.25 | 4.0 | 0.23 | 1.2 | 4.5 | | 25 | 2 min | Soft. |
| 9 | Al₂(SO₄)₃ | do | 0.3 | 0.26 | 7.0 | 7L | 7.0 | 4.8 | 5.8 | 0.37 | 5.9 | | 25 | 1 hr | Do. |
| 10 | Al₂(SO₄)₃ | do | 0.3 | 0.26 | 7.0 | 7L | 5.0 | 4.7 | 4.5 | 0.05 | 5.8 | | 25 | 2.5 hr | Do. |
| 11 | Al₂(SO₄)₃ | do | 0.3 | 0.26 | 7.0 | 9M | 1.0 | 4.7 | 0.91 | 0.28 | 7.0 | | 25 | 6.5 hr | Do. |
| 12 | Al₂(SO₄)₃ | do | 0.3 | 0.26 | 7.0 | 4H | 1.0 | 4.7 | 0.91 | 0.25 | 5.3 | | 25 | 4 hr | Do. |
| 13 | Al₂(SO₄)₃ | Malic acid | 0.6 | 0.26 | 7.2 | 7M | 1.0 | 5.8 | 0.91 | 0.40 | 5.5 | | 25 | 1.5 hr | Do. |
| 14 | Al₂(SO₄)₃ | Potassium citrate | 0.3 | 0.26 | 7.0 | 7H | 1.0 | 4.2 | 0.91 | 0.27 | 6.2 | | 25 | 45 min | Do. |
| 15 | Al₂(SO₄)₃ | Sodium citrate | 0.3 | 0.26 | 7.0 | 7H | 1.0 | 7.5 | 0.91 | 0.28 | 5.0 | | 25 | 15 min | Firm. |
| 16 | Al₂(SO₄)₃ | Citric acid | 0.3 | 0.26 | 6.5 | 7H | 1.0 | 7.0 | 0.91 | 0.28 | 6.9 | | 25 | 5 min | Soft. |
| 17 | Al₂(SO₄)₃ | do | 0.3 | 0.26 | 7.0 | 7H | 1.0 | 5.5 | 0.91 | 0.28 | 6.5 | 1% NaCl | 100 | 4 hr | Do. |
| 18 | Al₂(SO₄)₃ | do | 0.3 | 0.26 | 7.0 | 7H | 1.0 | 7.0 | 0.91 | 0.28 | 6.3 | 10% sugar | 25 | 30 min | Firm. |
| 19 | Al₂(SO₄)₃ | do | 0.3 | 0.26 | 5.5 | 7H | 1.0 | 7.0 | 0.91 | 0.28 | 6.6 | | 25 | 35 min | Firm. |
| 20 | KAl(SO₄)₂ | do | 0.3 | 0.26 | 6.5 | 7H | 1.0 | 7.0 | 0.91 | 0.28 | 6.8 | | 25 | 80 min | Soft. |
| 21 | Al₂(SO₄)₃ | do | 0.3 | 0.1 | 6.5 | 7H | 1.0 | 7.0 | 0.99 | 0.11 | 6.8 | | 25 | 40 min | Firm. |
| 22 | Al₂(SO₄)₃ | do | 0.3 | 5.0 | 7.0 | 7H | 1.0 | 5.8 | 0.91 | 0.28 | 6.7 | | 25 | 4.5 hr | Soft. |
| 23 | Al₂(SO₄)₃ | do | 0.3 | 0.26 | 7.0 | 7H | 1.0 | 6.6 | 0.91 | 0.28 | 6.4 | Banana slices, 20% of final wt. | 25 | 100 min | Do. |
| 24 | Al₂(SO₄)₃ | Maleic acid | 0.3 | 0.26 | 5.4 | 7H | 1.0 | 4.7 | 0.91 | 0.28 | 5.3 | | 25 | 1 hr | Do. |
| 25 | Al₂(SO₄)₃ | do | 0.3 | 0.26 | 5.4 | 7H | 1.0 | 4.7 | 0.91 | 0.28 | 6.0 | | 25 | 2 hr | Do. |
| 26 | Al₂(SO₄)₃ | Oxalic acid | 0.5 | 0.26 | 5.8 | 7H | 1.0 | 4.7 | 0.91 | 0.28 | 5.5 | | 25 | 25 min | Do. |
| 27 | Al₂(SO₄)₃ | Malonic acid | 0.5 | 0.26 | 5.7 | 7H | 1.0 | 4.7 | 0.91 | 0.28 | 5.4 | | 25 | 1 hr | Do. |
| 28 | Al₂(SO₄)₃ | Lactic acid | 0.5 | 0.26 | 5.4 | 7H | 1.0 | 4.4 | 0.91 | 0.28 | 5.1 | | 25 | 45 min | Do. |
| 29 | Al₂(SO₄)₃ | Tartaric acid | 0.5 | 0.26 | 7.0 | 7H | 1.0 | 4.8 | 0.91 | 0.28 | 5.9 | | 25 | 15 min | Do. |

¹ Na salt unless specified.
² D.S.: 4H is 0.38–0.48, 7L is 0.65–0.85, 7M is 0.65–0.85, 7H is 0.65–0.85, 9M is 0.80–0.95; Brookfield viscosity cps. (25° C.): 4,800–1,000 (1%), 25–50 (2%), 300–600 (2%), 1,300–2,200 (1%), 800–3,100 (2%).
³ K salt of CMC.
⁴ Does not include solid additives.

Thus while the process of the present invention for gelling CMC comprises mixing an aqueous solution of soluble aluminum salts with an aqueous solution of CMC, two important conditions must be met prior to mixing. Not only must the aluminum salt be partially chelated (complexed) before mixing with the CMC, but also the pH of the partially chelated aluminum salt solution must be raised to a pH of 4.5 – 9.0 which is critical. Prior to adjusting the pH of the partially chelated aluminum salt solution, its pH is about 2–3 and when mixed at this pH with CMC, gelation of the CMC is far too fast. However when the soluble aluminum salt is partially chelated and its pH adjusted according to the present invention, it may be used to gel CMC and the time of gelation may be controlled to any period desired throughout a wide time range. After the partially chelated aluminum salt solution of pH 4.5 – 9.0 is mixed with CMC the pH of the final mixture must be in the range of 4.5 – 7.0, and this may be effected by adjusting the pH of the CMC solution by adding a base or acid thereto or by similar adjustment of the pH of the final mixture. The base or acid used is not critical and includes e.g., sodium hydroxide, potassium hydroxide, sodium carbonate, hydrochloric acid, acetic acid.

In addition to pH, gelation time is also somewhat dependent on chelate, chelate/aluminum molar ratio, relative volumes of chelated aluminum salt solution and CMC solution and type CMC (D.S. and viscosity), CMC concentration, aluminum ion concentration, gelation temperature. Usually the gelation temperature will be about 25° – 100° C., however as the artisan will appreciate temperatures outside this range can be used in some cases. As might be expected, gelation occurs more rapidly at elevated temperatures.

Chelants applicable include the following acids and also their sodium, potassium and other water soluble salts. Alpha-hydroxy mono- and dicarboxylic acids of 3–4 carbon atoms, e.g., malic, lactic and tartaric, beta-hydroxy tricarboxylic acids e.g., citric, and dicarboxylic acids of 2–4 carbon atoms e.g., oxalic, malonic and maleic. For food uses the preferred chelants are citric and malic acids and their salts.

Applicable chelant/aluminum molar ratio range is about 0.2 – 0.9, preferably about 0.3 – 0.8. The particular ratio used depends on the chelant used. Desirably the amount of chelant is sufficient to prevent any substantial precipitation of aluminum hydroxide at the pH to which the aluminum salt solution is finally adjusted.

Water soluble salts of CMC are applicable including e.g., the sodium, potassium and ammonium salts. CMC having D.S. values of about 0.4 – 1.4 are preferred, a D.S. of about 0.65 – 0.95 being specifically preferred for food uses. All viscosity types (e.g., low, medium and high) of CMC can be used, but preferable are the high viscosity types e.g., those whose 1 percent aqueous solutions give 25° C. Brookfield viscosities of about 1,000–4,000 cps. Desirably the CMC concentration of the pH adjusted aqueous CMC solution is about 0.25 – 7 percent by weight thereof. The CMC concentration of the final mixture (i.e., of the pH adjusted chelated aluminum salt solution mixed with the pH adjusted CMC solution) is about 0.2 – 5 percent preferably 0.25 – 1 percent for high viscosity types, 0.75 – 2.0 percent for medium viscosity types, and 2.0 – 5 percent for low viscosity types.

Although any water soluble aluminum salt may be used, for food applications usually one will use those salts which are approved as intentional food additives, including e.g., aluminum sulfate and the sodium, potassium or aluminum alums. When using aluminum sulfate usually the amount will be about 0.03 – 0.03 percent by weight of the total water in the final mixture, this range being about 3 – 130 percent by weight of the CMC used. The preferred amounts of aluminum sulfate by weight of the CMC are about 9 – 65 percent for high viscosity types, about 15 – 30 percent for medium viscosity types and about 3 – 15 percent for low viscosity types. As the artisan will appreciate other water soluble aluminum salts can also be used including e.g., aluminum chloride, aluminum nitrate; and even trivalent iron salts can be used.

The concentration of chelated aluminum salt solution is not critical and usually will be about 0.1 – 5 percent, preferably 0.2 – 0.5 percent, aluminum content by weight of said solution. It is pointed out hereinbefore that the pH of the aluminum salt solution prior to mixing with CMC is critical and must be a pH of 4.5 – 9, and that the pH of this solution as prepared is normally about 2 – 3. The pH is raised to the proper level by adding a base. Any base is suitable but certain ones are preferred, particularly for food use, including e.g., sodium hydroxide, potassium hydroxide, sodium carbonate.

The relative proportions of the chelated aluminum salt solution and CMC solution must be such as to provide in the final mixture thereof a molar ratio of aluminum atoms to anionic functional groups in the CMC of about 0.05 – 1.2, and a CMC content of about 0.2 – 5 percent by weight of the total water present.

The advantages of preparing gels according to this invention are many. The delay of gelation for various periods of time (e.g., about 2 mins. to 8 hrs. after mixing the gel ingredients) allows for ample manipulation time. The solutions can be transferred to individual containers before the onset of gelation, or can be transported as liquids to other locations if desired. Other insoluble ingredients can be added prior to onset of thickening and thus it is not necessary to subject them to shear during mixing the liquids. The choice of sources of aluminum ions is largely expanded over previous methods. It is no longer necessary to add the soluble aluminum salts very slowly as was previously necessary. The consistencies of the gels can be varied easily. In order to obtain a firm or rigid gel, it is no longer necessary to add prohibitively large (for systems, e.g.) amounts of aluminum salt. The gels are clear and nongrainy, two qualities lacking when the prior art slowly soluble aluminum salts are used. There is no longer the need to be concerned about the age, particle size or solubility of the aluminum salt, or the age of the chelated aluminum salt solution.

One important use for these gel systems involves food applications. Many other ingredients, water soluble and insoluble, can be added to the gel systems. Examples of these are sugars (e.g. corn, cane), fruits, salts, starches, vegetables, proteins which do not form insoluble complexes with CMC in the pH range used. In addition, the CMC can be used to totally or partially replace starches and other gums in various systems in which they are conventionally used as thickeners and stabilizers. Therefore the types of food systems applicable are numerous, some of which are here outlined as examples: (1) with food coloring and flavoring, optionally with fruits, to give a firm, gelled after-dinner dessert, (2) gelled condiments, e.g., pickles, olives, (3) custards and puddings, (4) jellied candies, e.g., jelly beans, gum drops, (5) thick sauces, e.g., Hollandaise, gravies, cranberry.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing a gel which comprises mixing the following ingredients, the gelling action being controlled so as to be effected at any time desired over a substantial period of time after said ingredients are mixed:
   (a) a first water solution comprising (1) aqueous aluminum sulfate, or an aqueous sodium, potassium or ammonium alum, the aluminum concentration being about 0.1 – 5 percent by weight of (a), (2) an aluminum chelant, the chelant/aluminum molar ratio being about 0.2 – 0.9, and (3) a base in an amount sufficient to adjust the pH of said first water solution to 4.5 – 9.0, and
   (b) a second water solution comprising aqueous carboxymethylcellulose having a concentration of about 0.25 – 7.0 percent by weight of (b),
   the relative proportions of (a) and (b) employed being such as to provide in the final mixture thereof a molar ratio of aluminum atoms to anionic functional groups in the carboxymethylcellulose of about 0.05 – 1.2, and a carboxymethylcellulose content of about 0.2 – 5.0 percent by weight of the total water present, and then adjusting the final mixture to a pH of about 4.5 – 7.0.

2. Process of preparing a gel which comprises mixing the following ingredients, the gelling action being controlled so as to be effected at any time desired over a substantial period of time after said ingredients are mixed:
   (a) a first water solution comprising (1) aqueous aluminum sulfate, or an aqueous sodium, potassium or ammonium alum, the aluminum concentration being about 0.1 – 5 percent by weight of (a), (2) an aluminum chelant, the chelant/aluminum molar ratio being about 0.2 – 0.9, and (3) a base in an amount sufficient to adjust the pH of said first water solution to 4.5 – 9.0, and
   (b) a second water solution comprising (1) aqueous carboxymethylcellulose having a concentration of about 0.25 – 7.0 percent by weight of (b), and (2) a base or acid in an amount sufficient to adjust the pH of said second water solution to about 4.0 – 7.5,
   the relative proportions of (a) and (b) employed being such as to provide in the final mixture thereof a molar ratio of aluminum atoms to anionic functional groups in the carboxymethylcellulose of about 0.05 – 1.2, a carboxymethylcellulose content of about 0.2 – 5.0 percent by weight of the total water present, and a pH of about 4.5 – 7.0.

3. The process of claim 2 wherein the chelant is citric or malic acid or water soluble salt thereof and wherein a foodstuff is employed as an additional ingredient.

* * * * *